United States Patent Office 2,735,865
Patented Feb. 21, 1956

2,735,865

PROCESS FOR PURIFYING P-AMINOBENZOIC ACID

Arthur Robert Lyding, New Haven, Conn., assignor to Heyden Chemical Corporation, New York, N. Y., a corporation of Delaware No Drawing. Application July 18, 1952,
Serial No. 299,733

8 Claims. (Cl. 260—518)

This invention relates to p-aminobenzoic acid, and more specifically, to a new and improved method for the purification and decolorization of this acid.

A conventional method for the preparation of p-aminobenzoic acid involves the reduction of para-nitrobenzoic acid which is formed by the oxidation of para-nitrotoluene. The equation for this reaction is as follows:

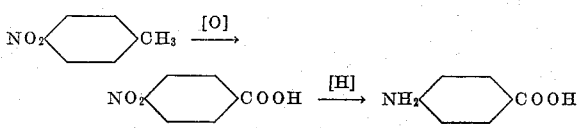

The p-aminobenzoic acid can likewise be prepared by the amination of para-chlorobenzoic acid.

In the preparation of p-aminobenzoic acid by conventional methods, certain dark colored impurities are formed which tend to discolor the product and the subsequent compounds prepared from it. For example, the acid is often too dark for use in the manufacture of derivatives employed in the preparation of pharmaceutical products such as for example, procaine, a local anesthetic. It is therefore necessary that p-aminobenzoic acid should be prepared in substantially pure and color-free form when it is used either in the preparation of pharmaceutical products or in clinical applications when combined with other pharmaceutical materials. In connection with its clinical applications, it has been demonstrated that the oral administration of p-aminobenzoic acid and salicylates in combination provide higher salicylate levels in the blood than is the case when the salicylates are administered alone.

Heretofore, while p-aminobenzoic acid products of substantial purity have been prepared, the material was characterized in many instances by an undesirable color. Attempts to remove undesirable coloration from p-aminobenzoic acid have, in general, not been satisfactory.

Broadly stated, I have developed a process wherein a substantially color-free p-aminobenzoic acid product of high quality and suitable for use in the preparation of pharmaceutical products can be prepared by the combination of treatments with activated carbon together with a water soluble inorganic alkali salt in a atmosphere of nitrogen. The p-aminobenzoic acid that is recovered from this treatment is substantially color-free and possesses a low APHA color factor; i. e. less than 30 (American Public Health Association color standard—determined by dissolving 1 part of p-aminobenzoic acid in 50 parts of methanol and comparing it with color standards which are referred to as Hazen Color Standards—"Standard Methods for Examination of water and Sewage"—8th edition—1936—page 13—published by American Public Health Association). The pharmaceutical preparations containing this substantially pure and color-free p-aminobenzoic acid or derivatives of this acid satisfy the standards set therefor by the United States Pharmacopoeia.

More specifically, an aqueous solution containing the crude p-aminobenzoic acid prepared by a conventional process is neutralized to a pH value varying between 5 to 7 by the addition of an alkaline material, for example, sodium carbonate, a dilute sodium hydroxide, a potassium carbonate, etc. A suitable amount; i. e. about 5 to 20% based on the weight of p-aminobenzoic acid used, of activated carbon is then added to the solution, followed by the bubbling in of nitrogen gas. The purpose of the addition of nitrogen gas is to provide a substantially oxygen-free atmopshere thereby maintaining the solution out of contact with the air and minimizing the possibility for any oxidation of the material which is being purified. During the continuous addition of the nitrogen, the mixture is heated just below its boiling point, i. e. to a temperature varying between 80°–90° C., and that temperature is maintained for a short period of time, for example, fifteen or twenty minutes, accompanied by occasional swirling.

The hot suspension is filtered through a fluted filter and the filtrate is again treated with activated carbon under the same conditions described previously. The suspension is once again filtered through a fluted filter.

The filtrate is then cooled to room temperature and an inorganic water soluble alkali metal sulfite such as for example, sodium sulfite, potassium sulfite, sodium metabisulfite, is added while swirling. At this point the solution is practically color-free.

Another addition of an activated carbon is made at this point and the suspension is swirled in an atmosphere of nitrogen while heating gently; i. e. a temperature of about 40°–50° C. for a period of about twenty minutes. The suspension is once again filtered through a fluted filter. The filtration is effected in this fashion and not by the customary method of suction since the latter method causes an increase in color, a result of oxidation by the air. If suction is used, filtration should be carried in an atmosphere of nitrogen to avoid oxidation.

The solution is then warmed to a point just below its boiling point; i. e. about 80° C., accompanied by swirling in an atmosphere of nitrogen.

The pH of the solution is carefully adjusted to a pH varying between 3.5 to 4, by the addition of an aqueous solution of an inorganic acid, for example, hydrochloric acid. At this point, the solution is allowed to cool gradually, the addition of nitrogen being continued. When the temperature of the solution is about 30° C., the mixture is slowly chilled to a temperature of about 5°–10° C. The substantially pure and color-free needles of p-aminobenzoic acid are filtered in an atmosphere of nitrogen and washed with iced-distilled water. After drying, a substantially color-free product of high purity in crystalline form is obtained.

It should be mentioned that the pH throughout the decolorization should not be allowed to go below about 5 as the acid would precipitate during filtration of the carbon. Similarly, the pH should not be allowed to increase above about 7 because of the marked decrease in efficiency of the carbon above this pH range.

The quantity of the water soluble, inorganic alkali metal sulfite should not exceed about 0.6% based on the weight of p-aminobenzoic acid in order to prevent the detection of the undesirable odor of hydrogen sulfite. At least about 0.1% of sulfite should be used with the optimum quantity of sulfite being about 0.3% to 0.4%.

The following example illustrates a method of carrying out the present invention but it is to be understood that this example is given by way of illustration and not of limitation, except as set forth.

Example

Fifteen grams of crude p-aminobenzoic acid is suspended in 100 ml. of distilled water in a flask suitable for admission of nitrogen. The acid is then neutralized by the gradual addition of 5.5 g. of sodium carbonate. After solution is complete, 1 g. of activated carbon is added and the nitrogen gas is admitted into the system. While the admission of nitrogen gas is continued, the mixture is heated to 80°–90° C. and maintained at that temperature for fifteen to twenty minutes with occasional swirling.

The hot suspension is filtered through a fluted filter and the filtrate is again treated with activated carbon and decolorized in exactly the same manner as previously indicated. This suspension is also filtered through a fluted filter.

At this point, the filtrate is cooled to room temperature and 0.05 g. of sodium hydrosulfite is added accompanied by swirling. The solution is now practically colorless.

Another addition of 1 g. of activated carbon is made and the suspension is swirled in an atmosphere of nitrogen gas at 40°–50° C. for twenty minutes. The suspension is again filtered through a fluted filter.

The solution is warmed to a temperature of 80° C. accompanied by swirling under a nitrogen blanket. Eight milliliters of 37% hydrochloric acid is added while carefully adjusting the pH to 3.5–4.0 to convert the alkali metal salt of the p-aminobenzoic acid to p-aminobenzoic acid. Swirling is continued until all of the acid is in solution. At this point, the solution is allowed to cool gradually (one hour) with the admission of nitrogen gas being continued. When the temperature of the solution reaches 30° C., the mixture is chilled slowly to 5°–10° C.

The needles of p-aminobenzoic acid are filtered in an atmosphere of nitrogen gas and then washed with 2–25 ml. portions of ice-distilled water. After drying in a vacuum oven, 7.5 g. (a yield of 50%) of a substantially pure and color-free p-aminobenzoic acid is obtained.

It is absolutely essential that an atmosphere of nitrogen should be maintained wherever necessary since the colors of the liquors are considerably darker in all stages if this is not done.

In the following there is compared the APHA color factors of two samples. Sample I was prepared as described in detail in the example. Sample II was prepared in an identical manner except that nitrogen was omitted.

|  | APHA Color # (1 g./50 ml. Methanol) | Remarks |
| --- | --- | --- |
| Sample I | 26 | Nitrogen. |
| Sample II | 100–200 | No Nitrogen. |

The number of carbon treatments called for must be adhered to as the elimination of any one of them causes APHA colors of 150–250 while the elimination of two carbon treatments caused very dark material to form. The use of activated carbon is also essential since the use of other carbon material will form a dark liquor. The use of an inorganic, water-soluble alkali metal sulfite salt such as sodium hydrosulphite is also a requisite for the success of the purification. Comparative samples III and IV which were prepared as discussed in detail in the example except for the lack of nitrogen, illustrate the effect of the sulphite.

|  | APHA Color # (1 g./50 ml. CH₃OH) | Remarks |
| --- | --- | --- |
| Sample III | 230 | No sodium hydrosulphite. |
| Sample IV | 98 | Sodium hydrosulphite. |

For maximum efficiency, the amounts of carbon designated should be adhered to. If the quantity of carbon in each procedure is decreased below the amounts set forth supra, a marked increase in color is apparent. For best results, the temperatures called for should be used. Any substantial departure from the indicated temperatures will likewise cause an increase in color of the treated material. To secure the maximum yield at the concluding step in the process, the liquor must be chilled to the low temperatures indicated.

While various modifications of the above invention have been described, it is to be understood that other variations may be made in carrying out this invention without departing from the spirit and scope thereof and when these modifications or changes are within the scope of the appended claims they are to be considered as part of this invention.

I claim:

1. A process for decolorizing p-aminobenzoic acid which comprises neutralizing an aqueous solution of said acid, adding a quantity of activated carbon varying between from 5% to 20% by weight of said p-aminobenzoic acid, heating said solution to a temperature ranging between 80°–90° C. under a blanket of nitrogen, removing said carbon by filtration, adding a further quantity of said activated carbon in the aforesaid amount to the filtrate followed by heating the solution to said temperature under a blanket of nitrogen, filtering the solution to remove the activated carbon, cooling the filtrate and then adding thereto a quantity of a water-soluble, inorganic alkali metal sulfite in an amount varying between 0.1–0.6% based on the weight of p-aminobenzoic acid followed by introducing into the resulting solution a further quantity of said activated carbon in the aforementioned amount, filtering to remove the carbon then heating the filtrate to a temperature of about 80° C., the aforementioned decolorization and purification steps being effected with the solution at a pH varying between 5–7, and acidifying the solution followed by cooling thereof to obtain p-aminobenzoic acid in substantially pure and color-free form.

2. A process for decolorizing p-aminobenzoic acid which comprises neutralizing an aqueous solution of said acid, adding a quantity of activated carbon varying between from 5% to 20% by weight of said p-aminobenzoic acid, heating said solution to a temperature ranging between 80°–90° C., under a blanket of nitrogen, removing said carbon by filtration, adding a further quantity of said activated carbon in the aforesaid amount to the filtrate followed by heating the solution to said temperature under a blanket of nitrogen, filtering the solution to remove the activated carbon, cooling the filtrate and then adding thereto a quantity of sodium sulfite in an amount varying between 0.1–0.6% based on the weight of p-aminobenzoic acid followed by introducing into the resulting solution a further quantity of said activated carbon in the aforementioned amount, filtering to remove the carbon then heating the filtrate to a temperature of about 80° C., the aforementioned decolorization and purification steps being effected with the solution at a pH varying between 5–7, and acidifying the solution follower by cooling thereof to obtain p-aminobenzoic acid in substantially pure and color-free form.

3. A process for decolorizing p-aminobenzoic acid which comprises neutralizing an aqueous solution of said acid, adding a quantity of activated carbon varying between from 5% to 20% by weight of said p-aminobenzoic acid, heating said solution to a temperature ranging between 80°–90° C. under a blanket of nitrogen, removing said carbon by filtration, adding a further quantity of said activated carbon in the aforesaid amount to the filtrate followed by heating the solution to said temperature under a blanket of nitrogen, filtering the solution to remove the activated carbon, cooling the filtrate and then adding thereto a quantity of potassium sulfite in an amount varying between 0.1–0.6% based on the weight of p-aminobenzoic acid followed by introducing into the resulting solution a further quantity of said activated carbon in the aforementioned amount, filtering to remove the carbon then heating the filtrate to a temperature of about 80° C., the aforementioned decolorization and purification steps being effected with the solution at a pH varying between 5-7, and acidifying the solution followed by cooling thereof to obtain p-aminobenzoic acid in substantially pure and color-free form.

4. A process for decolorizing p-aminobenzoic acid which comprises neutralizing an aqueous solution of said acid, adding a quantity of activated carbon varying between from 5% to 20% by weight of said p-aminobenzoic acid, heating said solution to a temperature ranging between 80°–90° C. under a blanket of nitrogen, removing said carbon by filtration, adding a further quantity of said activated carbon in the aforesaid amount to the filtrate followed by heating the solution to said temperature under a blanket of nitrogen, filtering the solution to remove the activated carbon, cooling the filtrate and then adding thereto a quantity of sodium hydrosulfite in an amount varying between 0.1–0.6% based on the weight of p-aminobenzoic acid followed by introducing into the resulting solution a further quantity of said activated carbon in the aforementioned amount, filtering to remove the carbon then heating the filtrate to a temperature of about 80° C., the aforementioned decolorization and purification steps being effected with the solution at a pH varying between 5-7, and acidifying the solution followed by cooling thereof to obtain p-aminobenzoic acid in substantially pure and color-free form.

5. A process for decolorizing p-aminobenzoic acid which comprises neutralizing an aqueous solution of said acid, adding a quantity of activated carbon varying between from 5% to 20% by weight of said p-aminobenzoic acid, heating said solution to a temperature ranging between 80°–90° C. under a blanket of nitrogen, removing said carbon by filtration, adding a further quantity of said activated carbon in the aforesaid amount to the filtrate followed by heating the solution to said temperature under a blanket of nitrogen, filtering the solution to remove the activated carbon, cooling the filtrate and then adding thereto a quantity of a water-soluble, inorganic alkali metal sulfite in an amount varying between about 0.3–0.4% based on the weight of p-aminobenzoic acid followed by introducing into the resulting solution a further quantity of said activated carbon in the aforementioned amount, filtering to remove the carbon then heating the filtrate to a temperature of about 80° C., the aforementioned decolorization and purification steps being effected with the solution at a pH varying between 5-7, and acidifying the solution followed by cooling thereof to obtain p-aminobenzoic acid in substantially pure and color-free form.

6. A process for decolorizing p-aminobenzoic acid which comprises neutralizing an aqueous solution of said acid, adding a quantity of activated carbon varying between from 5% to 20% by weight of said p-aminobenzoic acid, heating said solution to a temperature ranging between 80°–90° C. under a blanket of nitrogen, removing said carbon by filtration, adding a further quantity of said activated carbon in the aforesaid amount to the filtrate followed by heating the solution to said temperature under a blanket of nitrogen, filtering the solution to remove the activated carbon, cooling the filtrate and then adding thereto a quantity of sodium sulfite in an amount varying between about 0.3–0.4% based on the weight of p-aminobenzoic acid followed by introducing into the resulting solution a further quantity of said activated carbon in the aforementioned amount, filtering to remove the carbon then heating the filtrate to a temperature of about 80° C., the aforementioned decolorization and purification steps being effected with the solution at a pH varying between 5-7, and acidifying the solution followed by cooling thereof to obtain p-aminobenzoic acid in substantially pure and color-free form.

7. A process for decolorizing p-aminobenzoic acid which comprises neutralizing an aqueous solution of said acid, adding a quantity of activated carbon varying between from 5% to 20% by weight of said p-aminobenzoic acid, heating said solution to a temperature ranging between 80°–90° C. under a blanket of nitrogen, removing said carbon by filtration, adding a further quantity of said activated carbon in the aforesaid amount to the filtrate followed by heating the solution to said temperature under a blanket of nitrogen, filtering the solution to remove the activated carbon, cooling the filtrate and then adding thereto a quantity of sodium hydrosulfite in an amount varying between about 0.3–0.4% based on the weight of p-aminobenzoic acid followed by introducing into the resulting solution a further quantity of said activated carbon in the aforementioned amount, filtering to remove the carbon then heating the filtrate to a temperature of about 80° C., the aforementioned decolorization and purification steps being effected with the solution at a pH varying between 5-7, and acidifying the solution followed by cooling thereof to obtain p-aminobenzoic acid in substantially pure and color-free form.

8. A process for decolorizing p-aminobenzoic acid which comprises neutralizing an aqueous solution of said acid, adding a quantity of activated carbon varying between from 5% to 20% by weight of said p-aminobenzoic acid, heating said solution to a temperature ranging between 80°–90° C. under a blanket of nitrogen, removing said carbon by filtration, adding a further quantity of said activated carbon in the aforesaid amount to the filtrate followed by heating the solution to said temperature under a blanket of nitrogen, filtering the solution to remove the activated carbon, cooling the filtrate and then adding thereto a quantity of potassium hydrosulfite in an amount varying between about 0.3–0.4% based on the weight of p-aminobenzoic acid followed by introducing into the resulting solution a further quantity of said activated carbon in the aforementioned amount, filtering to remove the carbon then heating the filtrate to a temperature of about 80° C., the aforementioned decolorization and purification steps being effected with the solution at a pH varying between 5-7, and acidifying the solution followed by cooling thereof to obtain p-aminobenzoic acid in substantially pure and color-free form.

References Cited in the file of this patent

UNITED STATES PATENTS

| | | |
|---|---|---|
| 1,492,664 | Beall | May 6, 1924 |
| 2,540,785 | Hultquist | Feb. 6, 1951 |

FOREIGN PATENTS

| | | |
|---|---|---|
| 384,558 | Great Britain | Dec. 8, 1932 |

OTHER REFERENCES

Ravenscroft et al.: Trans. Electrochem. Soc., vol. 84, pp. 150–1 (1943).

Dey et al.: Chem. Abstracts, vol. 44, col. 9271 (1950).